(12) United States Patent
Viola

(10) Patent No.: US 6,672,253 B1
(45) Date of Patent: Jan. 6, 2004

(54) FLYING DISK TOY WITH ROPE

(76) Inventor: Charles A. Viola, 511 S. 2nd St., Fairfield, IA (US) 52556

( * ) Notice: Subject to any disclaimer, the term of this patent is extended or adjusted under 35 U.S.C. 154(b) by 0 days.

(21) Appl. No.: 10/364,154

(22) Filed: Feb. 10, 2003

(51) Int. Cl.[7] .............................................. A01K 29/00
(52) U.S. Cl. ........................ 119/709; 446/46; D21/444; D30/160
(58) Field of Search ................................ 119/707, 708, 119/709, 710; 446/46, 47, 48; 473/575, 576; D21/443, 444; D30/160

(56) References Cited

U.S. PATENT DOCUMENTS

| | | |
|---|---|---|
| 3,359,678 A | 12/1967 | Headrick |
| 4,132,030 A | 1/1979 | Lehman |
| 4,177,995 A * | 12/1979 | Surland ........................ 473/281 |
| 4,919,083 A | 4/1990 | Axelrod |
| 4,955,842 A | 9/1990 | Marcotti |
| D343,930 S * | 2/1994 | Garcia ........................ D30/160 |
| 5,676,581 A | 10/1997 | Ziegler |
| D387,513 S | 12/1997 | Mauldin, Jr. |
| 5,934,966 A | 8/1999 | Ward |
| 5,984,753 A | 11/1999 | Perez |
| 6,050,224 A * | 4/2000 | Owens ........................ 119/710 |
| 6,073,588 A * | 6/2000 | McClung, III et al. ..... 119/709 |
| D456,958 S * | 5/2002 | Weinacker, Jr. ............ D30/160 |

* cited by examiner

Primary Examiner—Robert P. Swiatek

(57) ABSTRACT

A dog toy (10) comprising a gyroflier disk (12) having a convex upper surface (22), a concave lower surface (24), and a circular rim around the circumference (26). Through the radial center of the disk (12) is an aperture (14). Inserted vertically into the aperture (14) is a short length of rope (16). The top end of the rope (16) is tied in a knot (18) that is positioned close to, and above, the upper surface (22) of the disk (12). The lower end of the rope (16) is tied in a knot (20) that is positioned close to, and below, the lower surface (22) of the disk (12). The lower knot (20) is large enough to cause the lower edge of the circumferential rim (26) to be positioned sufficiently above a relatively flat surface upon which the toy (10) rests that a dog may be able to insert its mouth under the rim (26) in order to pick up the toy (10). If the toy (10) is at rest on the ground or other relatively flat surface, the dog may pick it up by grabbing the upper knot (18) in its mouth. The dog may chew on the top or bottom rope knots (18, 20) while holding the disk (12) with its paws to stabilize the toy (10).

1 Claim, 5 Drawing Sheets

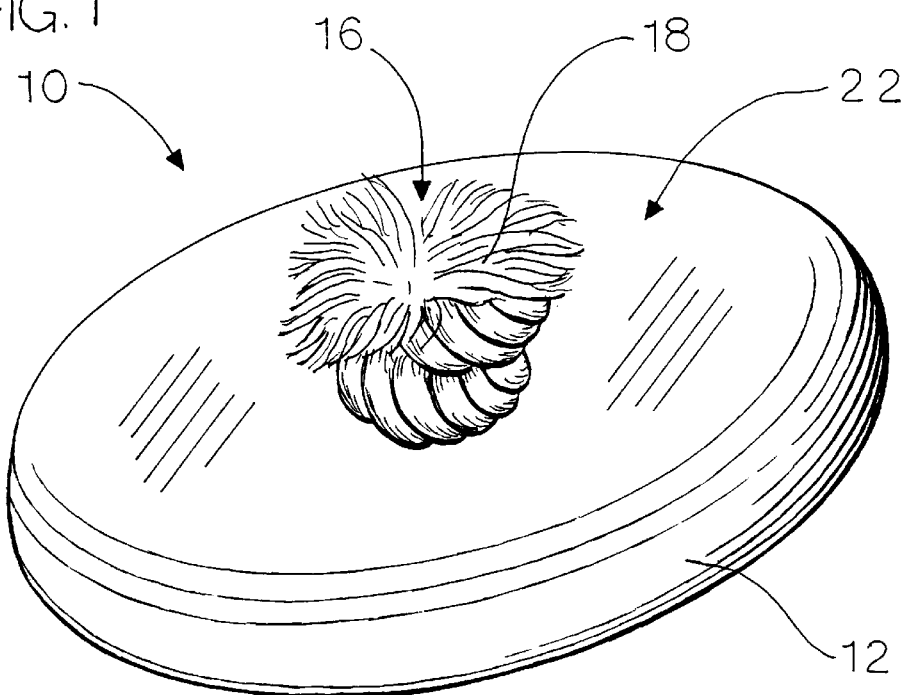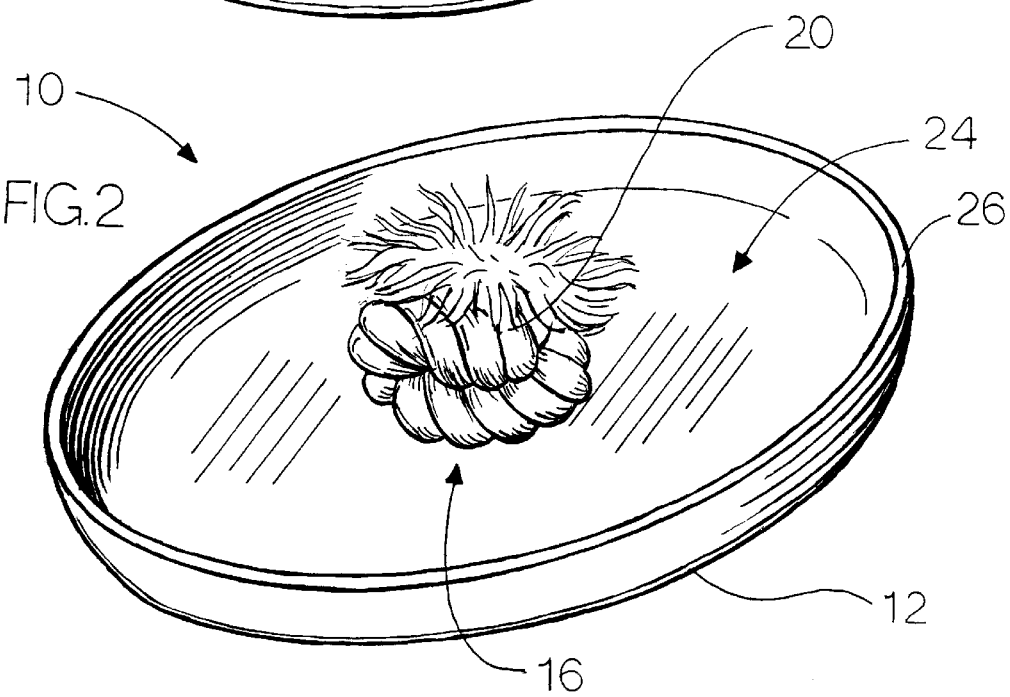

FLYING DISK TOY WITH ROPE

BACKGROUND

1. Field of the Invention

The presently disclosed invention relates to two kinds of toys that are intended for use by dogs: flying toys that are used by people and dogs in games of toss-and-catch and rope toys that are used by dogs for chewing.

Disk-shaped or saucer-shaped flying toys, also called gyrofliers, are commonly used for interactive play between people and dogs. The flying toy is tossed with backspin into the air by the person. As it hovers in the air, the dog will usually chase it and try to catch the toy in its mouth and may then retrieve it.

Dogs also enjoy chewing toys. Many chew toys have been created to accomodate the natural tendency of dogs to chew and gnaw on things. Some of the most successful chew toys are made of rope. It has been shown that dogs enjoy chewing on rope, especially if it is tied into knots. The knobby shape of a rope knot together with the gentle, but substantial resistance it provides make it an ideal chewing toy for a dog.

Background

2. Description of Prior Art

Dogs are known to enjoy catching and retrieving flying disks. Because a disk-shaped or saucer-shaped gyroflier tends to hover in flight for a long period of time, it provides an easy opportunity for a dog to catch it in mid air. People commonly play games with their dog in which the person tosses a disk-shaped gyroflier like the one taught in U.S. Pat. No. 3,359,678 to Headrick and the dog tries catch and retrieve it.

One problem with Headrick's disk toy is that, if it falls to the ground before the dog can catch it, the dog may find it difficult or impossible to pick up. If the disk is lying flat on the ground, the dog usually cannot get its mouth around it in order to pick it up. This can be a frustrating experience for the dog and also for the person who has to walk over to the disk and pick it up.

Inventors have patented flying disk toys that are intended to solve this problem. U.S. Pat. No. 4,919,083 to Axelrod, shows a flying disk with projecting ridge extending upwardly from the top surface in order to provide a means for the dog to grab and lift the disk with its mouth. U.S. Pat. No. 4,955,842 to Marcotti and U.S. Pat. No. 5,676,581 to Ziegler also teach a flying disk that has protruding features on the top surface that might allow a dog to grasp and pick up the disk.

U.S. Pat. No. 4,132,030 to Lehman, U.S. Pat. No. 5,934,966 to Ward, U.S. Pat. No. 5,984,753 to Perez, and U.S. Des. 387,513 to Mauldin Jr. all teach flying disk-shaped or saucer-shaped flying toys having protrusions extending downwardly from the bottom of the disk that cause the outer edge of the disk to be positioned high enough above the surface upon which the disk rests, so that the dog can get its mouth around the outer edge of the disk and thereby pick it up.

The presently disclosed flying disk may be grabbed and picked up by a dog two different ways. A dog may grab the rope knot that protrudes from the top of the disk or may grab the outer edge of the disk. By providing two different ways for a dog to grab it and pick it up, the new flyng disk represents an improvement over prior flying disks for dogs.

One problem with all of the prior art flying toys mentioned above is that, in order for them to fly easily and hover a long time in the air, they need to be made of a material that is lightweight or thin. Because they are made of light or thin material, they are usually not substantial enough to endure much chewing by a dog.

Dogs are known to enjoy chewing toys. Many toys having a rope knot are sold on the market for dogs to chew. Chewing on a rope knot is an activity that dogs seem to find enjoyable. It provides stimulation, excercise, and may help the dog to keep its teeth clean.

While rope toys are well suited for chewing, they are not well suited for games of toss-and-catch. Rope is heavy and does not have an airfoil shape to provide aerodynamic lift and so it does not hover long enough for a dog to catch it in mid air the same way it can catch a flying disk toy. The present invention combines a rope chew toy with a flying disk toy in a novel way and so it provides an improved form of toy for dogs.

SUMMARY

The invention disclosed herein comprises a flying disk with an aperture through its radial center. Inserted through the aperture is a short piece of rope, being of sufficient weight and strength as to endure steady chewing by a dog. The rope has knots on both of its ends. The bottom knot is of sufficient size as to raise at least part of the disk above the surface upon which it rests. The same device can be used as a flying toy that will hover in the air for games of toss-and-catch and toss-and-fetch and it can also be used as a chew toy. Because of its dual utility, it represents an improvement over prior flying disks and rope chew toys.

OBJECTS AND ADVANTAGES

The several objects and advantages of the present invention include:

(a) to provide a flying toy that may be tossed in the air and hover long enough in flight as to be easily caught by a dog;

(b) to provide a disk shaped flying toy that a dog may easily pick up by grabbing a rope knot protruding from the center of the upper surface of the disk;

(c) to provide a disk shaped flying toy that a dog may easily pick up by grabbing the outer rim of the disk;

(d) to provide a flying toy that may be chewed for prolonged periods of time without damage to the toy;

(e) to provide a chewing toy that may be tossed by a human and caught in flight by a dog.

DRAWING FIGURES

FIG. 1 shows the top of the invention in perspective.

FIG. 2 shows the bottom of the invention in perspective.

REFERENCE NUMERALS IN THE DRAWINGS

10—The device in its entirety
12—Disk portion of the device
14—Hole in the center of the disk
16—The rope in its entirety
18—Top knot portion of the rope
20—Bottom knot portion of the rope
22—Top surface of the disk
24—Bottom of the disk
26—Circumferential rim of the disk
28—The surface upon which the toy rests

DETAILED DESCRIPTION OF THE INVENTION

Figure 3:
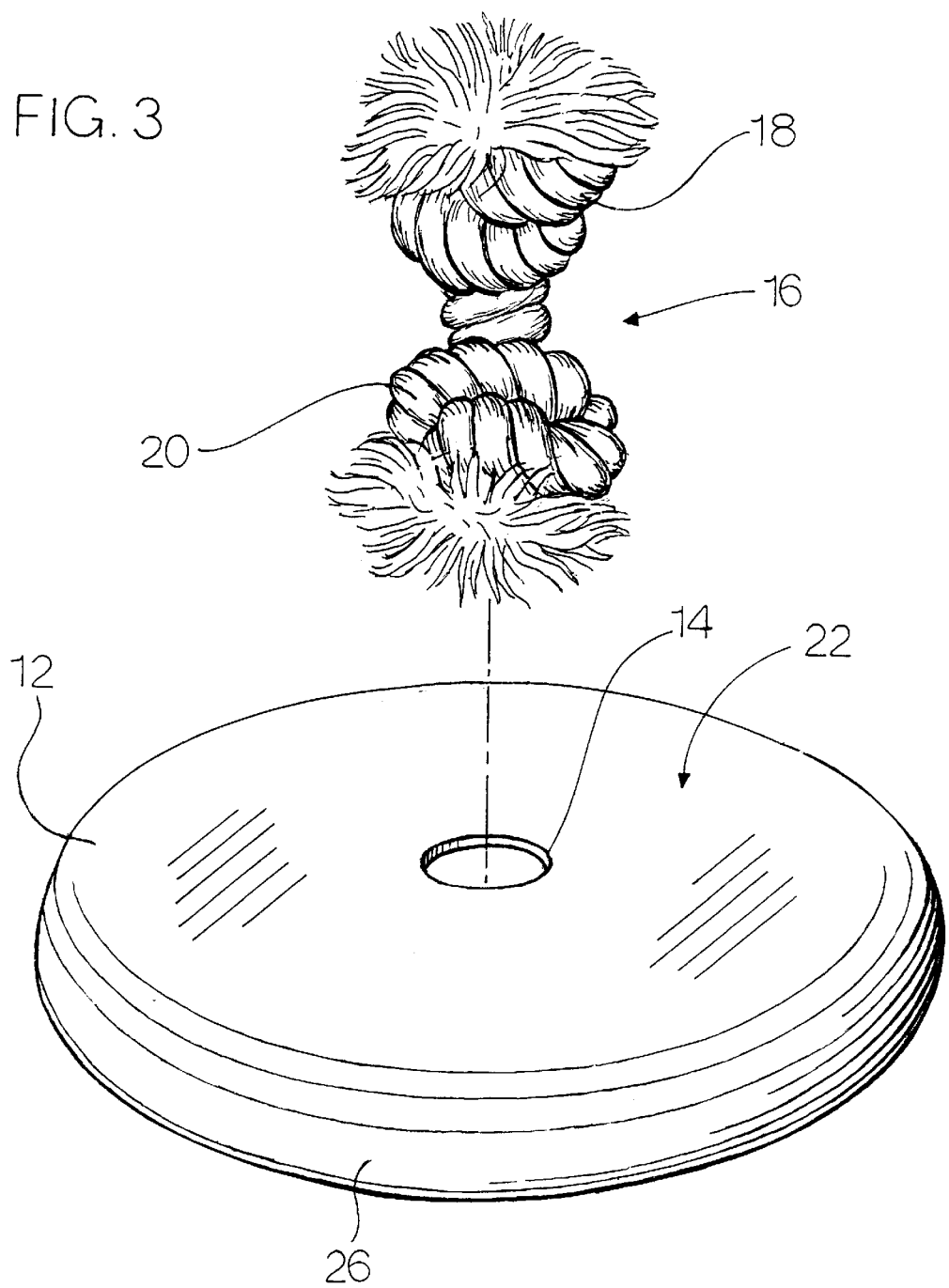
FIG. 3 is an exploded perspective view of the top of the invention showing the rope separated from the disk and the hole in the middle of the disk.
Figure 4:
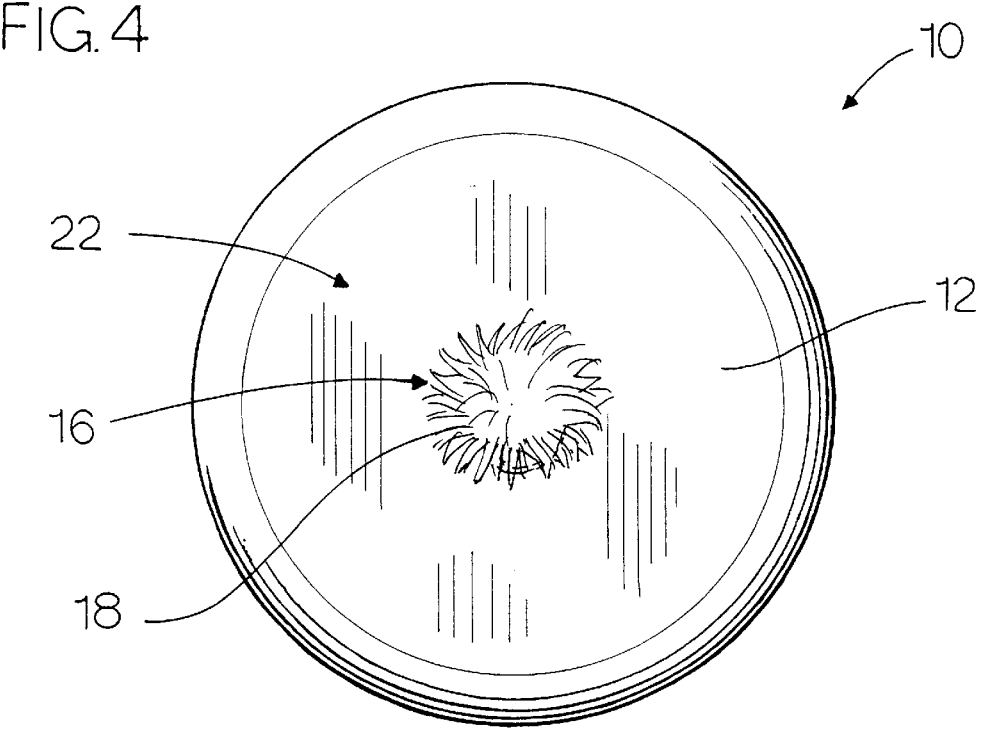
FIG. 4 is a top plan view of the invention.
Figure 5:
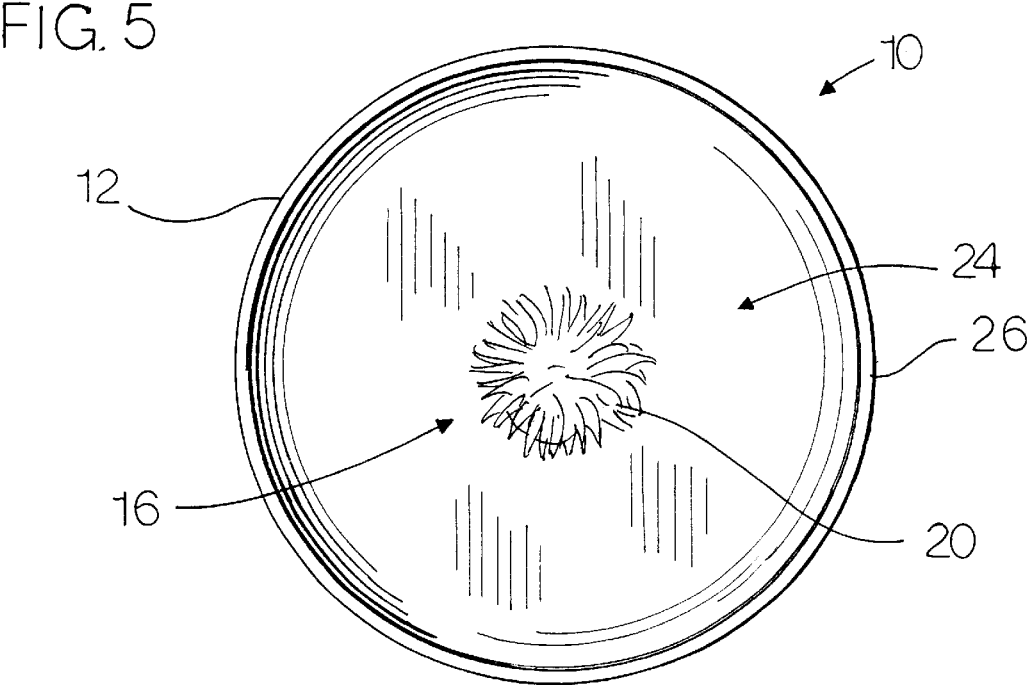
FIG. 5 is a bottom plan view of the invention.

The invention 10 comprises a flying disk 12 and a rope 16. In the preferred embodiment, the flying disk 12 is molded of a lightweight, flexible material such as polythylene plastic, so that it is light enough to allow the device 10 to hover in flight when tossed through the air and resilient enough to withstand the impact of crashing into obstacles or being stepped on. Preferably, the disk 12 is round in circumference (as shown in FIGS. 4 and 5), having a convex upper surface 22 that functions as an airfoil, and a concave underside 24 surrounded by a circumferential rim 26 that provides gyroscopic action as the disk is tossed through the air with backspin.

Figure 6:
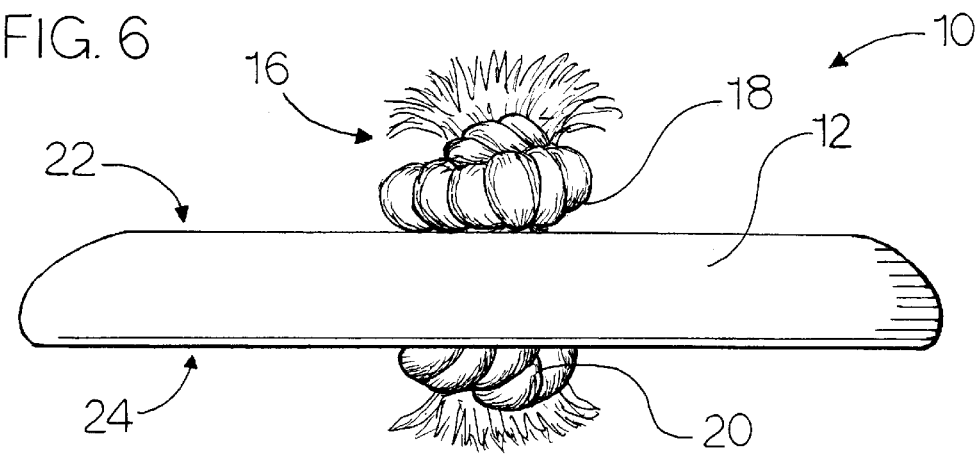
FIG. 6 is a side elevational view of the invention.
Figure 7:
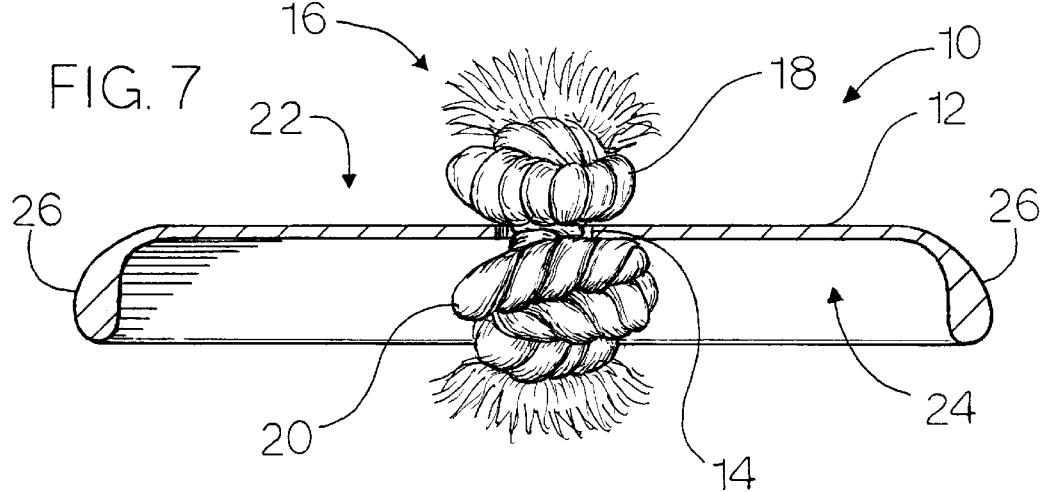
FIG. 7 is a side elevational view of the invention in cross-section.

The disk 12 has an aperture 14 in its radial center through which a short length of rope 16 is inserted. The rope 16 may be made of cotton, nylon, polypropylene or other similar material and should be heavy enough to withstand sustained chewing by a dog. The rope 16 has at least one knot 18 on its top end and at least one knot 20 on its bottom end. In the preferred embodiment, the rope is short enough so that the top knot 18 is close to the top surface 22 of the disk 12 and the bottom knot 20 is close to the bottom surface, or underside, 24 of the disk. The bottom knot or knots 20 should be large enough to extend downwardly beyond the bottom of the circumferential rim 26, (as shown in FIG. 6 and 7) thereby causing at least part of the rim 26 to be positioned above the surface 28 upon which the device 10 is resting. Because of the gap between the bottom of the rim 26 and the surface 28 upon which the device 10 rests, the dog may be able to get its mouth around the outer rim 26 of the device 10 and pick it up.

The dog may also pick up the device 10 by grabbing the top knot 18 that protrudes upwardly from the upper surface 22 of the disk 12.

The disk 12 should be of sufficient size in proportion to the rope as to allow enough aerodynamic lift during flight to overcome the weight of the rope 16.

Because the dog may easily pick up the device 10 from either the top knot 18 or from the outer rim 26, and because the device has rope knots 18,20 that the dog can chew on, the invention is an improvement over prior toss-and-fetch dog toys. Because the device is capable of hovering in the air, it is an improvement over prior chew toys with rope knots.

Operation

Figure 8:
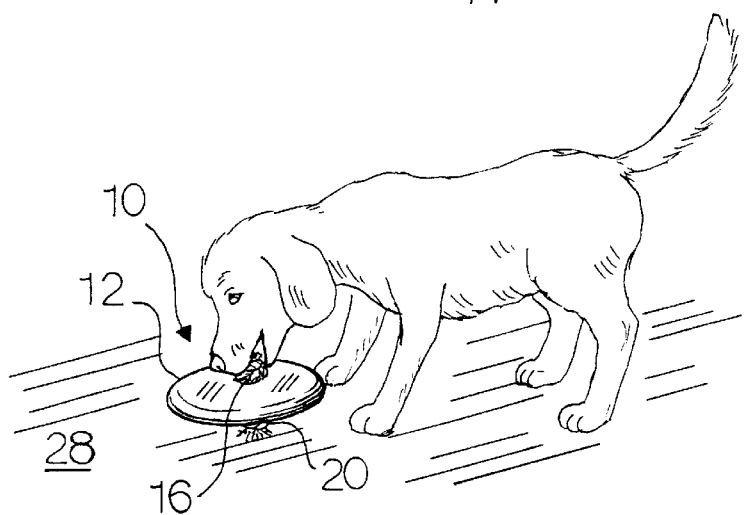
FIG. 8 shows a dog grabbing the top knot of the invention.
Figure 9:
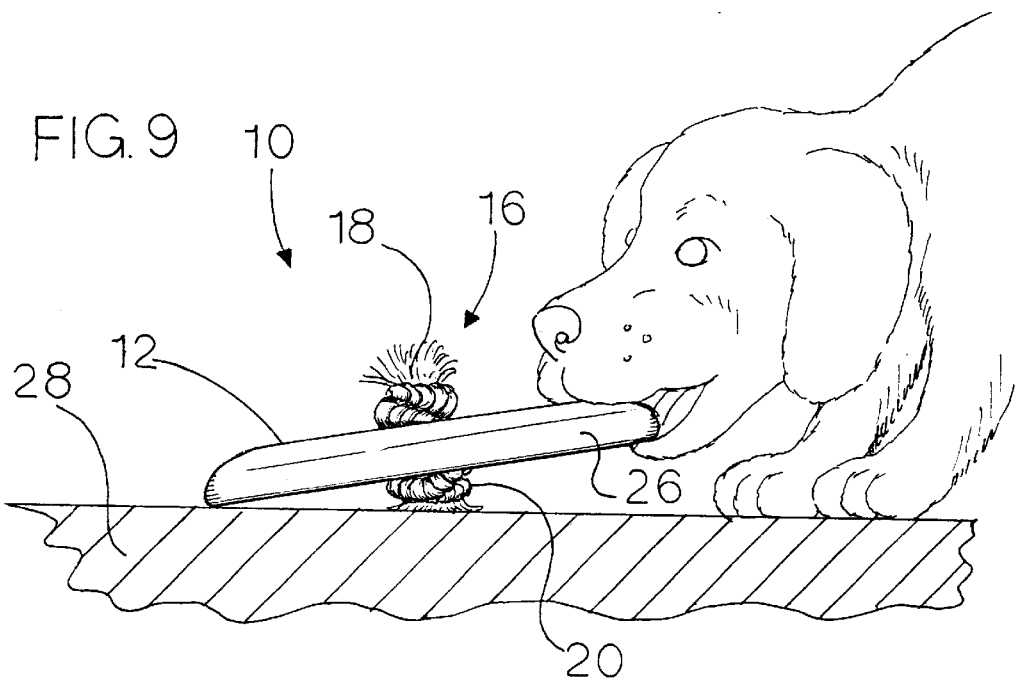
FIG. 9 shows a dog grabbing the outer rim of the disk of the invention.
Figure 10:
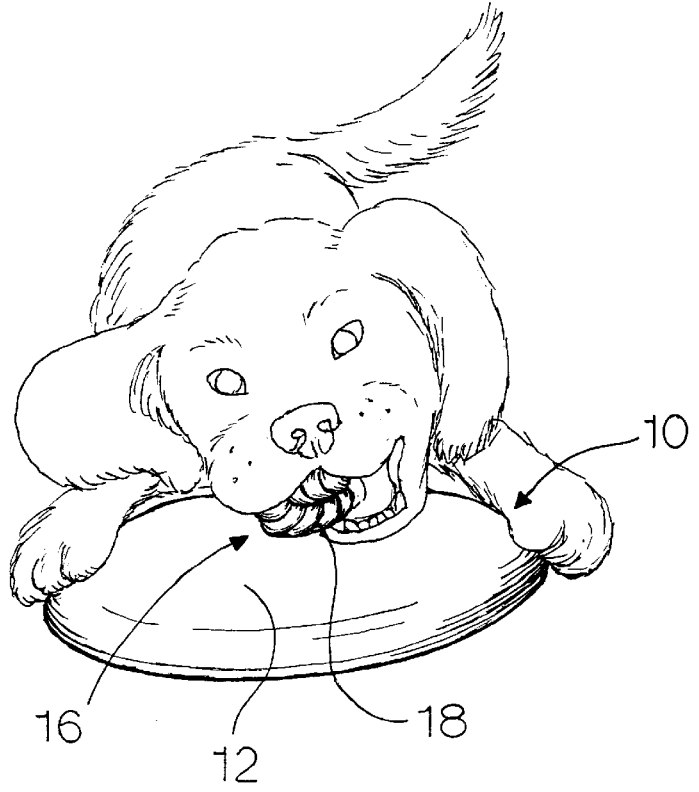
FIG. 10 shows a dog gnawing on the top knot of the invention while holding the disk portion with its paws.

The presently disclosed invention allows the human and canine users a wide variety of play possibilies. A person may toss the device 10 with backspin into the air in the manner of a typical gyroflier. The dog may catch the disk 12 in the air or may pick the device 10 up off the ground 28 after it has landed. The dog can pick up the device 10 by grabbing the top knot 18 in its mouth (as shown in FIG. 8) or grabbing the outer rim 26 (as shown in FIG. 9.) The dog may also use the device 10 as a chew toy by biting or gnawing on the rope knots 18 and 20. The disk 12 provides a means for the dog to hold the toy 10 steady with its paws, while gnawing on the top knot 18 (as shown in FIG. 10.)

CONCLUSION, RAMIFICATIONS, AND SCOPE

The invention disclosed herein is a new toy that can be used for interactive play involving games of toss-and-catch and toss-and-fetch between a person and a dog or dogs. It can also be used for solo play by the dog, in which the dog chews or gnaws on the rope knots while holding down the disk for better stability with its paws.

Many variations of the invention can be contemplated without altering the basic nature of the invention. For example the disk part of the invention can be made in a various shapes other than circular and can be molded of various materials such a lightweight flexible foam. The surface of the disk can be decorated with features molded in relief or graphics may be printed on it. Cloth, rubber, leather, or other flexible, chewable materials can be used in place of rope. The invention can be scented to further attract or interest the dog. Although the invention is intended as a toy for dogs, it may be used by cats, ferrets, birds, or other playing animals. Accordingly, the specificities mentioned above should not be construed as limiting the scope of the invention, but rather as providing illustrations of the preferred embodiment of the invention. Thus the scope of the invention should be determined by the appended claims and their legal equivalents.

What is claimed is:

1. A toy for dogs, comprising:
   (a) a gyroflier disk having a convex upper surface, a concave lower surface, and a circular rim defining the circumference,
   (b) said disk having a radially central aperture through the upper and lower surfaces,
   (c) positioned vertically through said aperture is a length of rope,
   (d) the upper end of said rope being tied in a knot,
   (e) the lower end of said rope being tied in a knot,
   (f) the upper knot being above and close to the upper surface of the disk,
   (g) the lower knot being below and close to the lower surface of the disk,
   (h) the lower knot being large enough to protrude below the lower edge of the circular rim.

* * * * *